(12) United States Patent
Yoshida et al.

(10) Patent No.: US 8,390,654 B2
(45) Date of Patent: Mar. 5, 2013

(54) DISPLAY AND METHOD FOR FABRICATING THE SAME

(75) Inventors: Hiroshi Yoshida, Osaka (JP); Mutsumi Nakajima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 616 days.

(21) Appl. No.: 12/673,415

(22) PCT Filed: Mar. 28, 2008

(86) PCT No.: PCT/JP2008/000813
§ 371 (c)(1),
(2), (4) Date: Feb. 12, 2010

(87) PCT Pub. No.: WO2009/028122
PCT Pub. Date: Mar. 5, 2009

(65) Prior Publication Data
US 2011/0205249 A1 Aug. 25, 2011

(30) Foreign Application Priority Data

Aug. 30, 2007 (JP) .................................. 2007-223776

(51) Int. Cl.
*G09G 5/10* (2006.01)
(52) U.S. Cl. ...................................... 345/690; 345/904

(58) Field of Classification Search .................... 345/32, 345/156, 204, 690, 904
See application file for complete search history.

(56) References Cited

U.S. PATENT DOCUMENTS
2002/0063844 A1   5/2002   Matsuura et al.

FOREIGN PATENT DOCUMENTS

| CN | 1740885 | 3/2006 |
|---|---|---|
| JP | 04-324819 | 11/1992 |
| JP | 05-210111 | 8/1993 |
| JP | 08-110527 | 4/1996 |
| JP | 09-113936 | 5/1997 |
| JP | 2002-341379 | 11/2002 |
| JP | 2002-350901 | 12/2002 |
| JP | 2006-126509 | 5/2006 |

OTHER PUBLICATIONS

International Search Report for PCT/JP2008/000813, mailed Jun. 10, 2008.

*Primary Examiner* — Ricardo L Osorio
(74) *Attorney, Agent, or Firm* — Nixon & Vanderhye, P.C.

(57) ABSTRACT

A repair step of repairing a pixel resulting in a defective bright spot so as to display the pixel in black is included. In the repair step, a drain portion of a TFT of the pixel resulting in the defective bright spot is shorted to a corresponding gate line, and in the pixel resulting in the defective bright spot, a semiconductor layer portion of the TFT is cut to allow electrical isolation between a corresponding source line and the corresponding gate line.

22 Claims, 6 Drawing Sheets

DISPLAY AND METHOD FOR FABRICATING THE SAME

This application is the U.S. national phase of International Application No. PCT/JP2008/000813, filed 28 Mar. 2008, which designated the U.S. and claims priority to Japanese Application No. 2007-223776, filed 30 Aug. 2007, the entire contents of each of which are hereby incorporated by reference.

TECHNICAL FIELD

The present invention relates to displays and methods for fabricating the same, and more particularly relates to the repair of pixel defects.

BACKGROUND ART

In recent years, there has been an increasing demand to improve the display quality of active matrix displays each including many switching elements, such as TFTs (thin film transistors). However, higher definition of display involves shrinking patterns of lines, etc., on a substrate. This makes it difficult to completely prevent display defects (including unlit dots) due to a break in the lines, etc., or shorting between adjacent ones of the lines.

For example, open defects in a TFT may occur where the TFT is always OFF. Alternatively, charge leakage (shorting) from an auxiliary capacitor may occur. Furthermore, degraded characteristics of a TFT may arise from failures in carrier doping for the TFT.

These defects may lead to display defects where bright spots are always displayed. The display defects where bright spots are always displayed are conspicuous to users. Therefore, they have been known to be repaired in the following manner: defective pixels are displayed in black by creating a short circuit between a gate line and a drain of a TFT, Specifically, in a normally white liquid crystal display, a short circuit is created between a drain of a TFT of a defective pixel and a corresponding gate line, and thus a relatively high voltage is generally continuously applied to a liquid crystal layer by a pixel electrode shorted to the gate line through the drain and a counter electrode (common electrode). As a result, the defective pixel is always displayed in black.

In PATENT DOCUMENT 1, an area of a TFT occupied by both its gate electrode and its drain electrode is irradiated with laser beams. Thus, a gate insulating film is destroyed so that the gate electrode and the drain electrode melt to allow electrical connection therebetween. A scan pulse is applied to liquid crystal material through a display electrode connected to the drain electrode. As a result, a corresponding pixel appears dark in a normally open mode, and therefore becomes less prominent.

PATENT DOCUMENT 2 describes that, in an active matrix display, a short circuit is created at a plurality of positions between a TFT corresponding to a defective pixel appearing as a bright spot and a line for repair by laser irradiation, thereby changing the bright spot to a black spot.

Furthermore, PATENT DOCUMENT 3 describes that, when a defective bright spot results from charge leakage from an auxiliary capacitor, a corresponding pixel electrode is cut into pieces so that a region of the auxiliary capacitor from which charges leak is located between outer ones of the pieces, and a short circuit is thus created between a drain of a corresponding TFT and a corresponding gate line, thereby displaying a corresponding pixel in black.

PATENT DOCUMENT 1: Japanese Patent Publication No. 5-210111
PATENT DOCUMENT 2: Japanese Patent Publication No. 4-324819
PATENT DOCUMENT 3: Japanese Patent Publication No. 2002-341379

SUMMARY OF THE INVENTION

Technical Problem

However, a short circuit between a gate line and a drain of a corresponding TFT as in the conventional art causes a short circuit between a corresponding source line and the gate line when the TFT is ON. As a result, the electric potential of the source line is reduced by being pulled to the electric potential of the gate line.

Moreover, a linear display failure (line defect) may be caused by pixels including a repaired defective pixel and arranged along source lines. Furthermore, a cross-shaped display failure may be caused by pixels including the centrally located repaired defective pixel.

The present invention has been made in view of the foregoing, and thus, it is an object of the invention to provide a display in which pixels are repaired by being displayed in black and which prevents a reduction in the voltage of a source line and reliably reduces display defects.

Solution to the Problem

In order to achieve the above object, in this invention, a pixel is repaired by displaying it in black in the following manner: a drain portion of a corresponding TFT is shorted to a corresponding gate line, and a corresponding source line is electrically isolated from the gate line.

Specifically, a method for fabricating an active matrix display of the present invention includes TFTs which are provided in one-to-one correspondence with a plurality of pixels and each include a semiconductor layer portion including a source portion and a drain portion, and a gate electrode, source lines connected to the source portions of the TFTs, and gate lines connected to the gate electrodes of the TFTs. The method includes a repair step of repairing one of the pixels resulting in a defective bright spot by displaying the pixel in black, and in the repair step, the drain portion of the TFT of the pixel resulting in the defective bright spot is shorted to the corresponding gate line, and in the pixel resulting in the defective bright spot, the semiconductor layer portion of the TFT is cut to allow electrical isolation between the corresponding source line and the corresponding gate line.

In the repair step, the drain portion of the TFT of the pixel resulting in the defective bright spot may be shorted to the gate line connected to the TFT of one of the pixels other than the pixel resulting in the defective bright spot.

In the repair step, the drain portion of the TFT may be shorted to the corresponding gate line by creating a short circuit between the corresponding semiconductor layer portion and the gate electrode of the TFT.

In each of the pixels, a short-circuit region for creating a short circuit between the drain portion of the corresponding TFT and the corresponding gate line is preferably extended from the gate line or the gate electrode of the TFT, and in the repair step, the drain portion of the TFT is preferably shorted to the gate line by the short-circuit region.

In the repair step, a conductive layer formed on a layer on which the corresponding source line is formed, and thus, connected to the corresponding drain portion may be shorted to the corresponding gate line.

Auxiliary capacitor elements for maintaining display potentials of the corresponding pixels are preferably provided in one-to-one correspondence with the plurality of pixels, and in the repair step, the auxiliary capacitor element of the pixel resulting in the defective bright spot is preferably further electrically isolated from the drain portion of the corresponding TFT.

In the repair step, a region of the semiconductor layer portion coinciding with a portion of the corresponding source line is preferably cut.

In the repair step, a region of the semiconductor layer portion which does not coincide with a portion of the corresponding source line may be cut.

Before the repair step, a light-blocking layer is preferably formed on a layer on which the corresponding source line is formed to coincide with a region of the semiconductor layer portion which is to be cut.

The light-blocking layer may be electrically connected to the drain portion of the corresponding TFT. Furthermore, the light-blocking layer may be electrically floated like an island.

Moreover, an active matrix display of the present invention includes: TFTs provided in one-to-one correspondence with a plurality of pixels; source lines connected to the TFTs; and gate lines connected to the TFTs. At least one of the plurality of pixels is a repaired pixel which is repaired by being displayed in black, and the repaired pixel includes a short-circuit portion for creating a short circuit between a drain portion of the corresponding TFT and the corresponding gate line; and a cut portion formed by cutting a semiconductor layer portion of the corresponding TFT to allow electrical isolation between the corresponding source line and the corresponding gate line.

The drain portion of the TFT of the repaired pixel may be shorted to the gate line connected to the TFT of one of the pixels other than the repaired pixel.

The short-circuit portion may create a short circuit between the corresponding semiconductor layer portion and the gate electrode of the corresponding TFT, thereby creating a short circuit between the drain portion of the corresponding TFT and the corresponding gate line.

In each of the pixels, a short-circuit region for creating a short circuit between the drain portion of the corresponding TFT and the corresponding gate line is preferably extended from the gate line or the gate electrode of the corresponding TFT, and the short-circuit portion is preferably formed on the short-circuit region.

The short-circuit portion may create a short circuit between a conductive layer formed on a layer on which the corresponding source line is formed so as to be connected to the corresponding drain portion, and the corresponding gate line.

Auxiliary capacitor elements for maintaining display potentials of the corresponding pixels are preferably provided in one-to-one correspondence with the plurality of pixels, and the auxiliary capacitor element of the repaired pixel is preferably further electrically isolated from the drain portion of the corresponding TFT.

The cut portion is preferably formed to coincide with a portion of the corresponding source line.

The cut portion may be formed so as not to coincide with a portion of the source line.

A light-blocking layer is preferably formed on a layer on which the source line is formed to coincide with the cut portion.

The light-blocking layer may be electrically connected to the drain portion of the corresponding TFT. Furthermore, the light-blocking layer may be electrically floated like an island.

-Functions-

Next, functions of the present invention will be described.

In the display of the present invention, the short-circuit portion is formed to create a short circuit between the drain portion of each of the TFTs and the corresponding gate line. Therefore, the electric potential of the drain portion of the repaired pixel is equal to that of the corresponding gate line. This allows the repaired pixel to be displayed in black.

Furthermore, the cut portion is formed in the semiconductor layer portion to allow electrical isolation between the corresponding source line and the corresponding gate line. This electrical isolation prevents the electric potential of the source line from being reduced by being pulled to the electric potential of the gate line. In view of the above, the repaired pixel is displayed in black so as to be repaired, and a reduction in the voltage of the source line is prevented, thereby reducing display defects (including single-line and cross-line display defects).

When the display is fabricated, the repair step of repairing the defective pixel resulting in the bright spot by displaying the pixel in black is performed. Through the repair step, the defective pixel resulting in the bright spot becomes a repaired pixel.

In the repair step, the drain portion of the TFT of the defective pixel resulting in the bright spot is shorted to the corresponding gate line, and in the defective pixel resulting in the bright spot, the semiconductor layer portion of the corresponding TFT is cut to allow electrical isolation between the corresponding source line and the corresponding gate line. In this manner, the short-circuit portion and the cut portion are formed.

In this case, when the drain portion is shorted to the gate line connected to the TFT of one of the pixels other than the defective pixel resulting in the bright spot, this can reduce degradation in display quality due to the parasitic capacitances between the pixels surrounding the repaired pixel and the repaired pixel.

Furthermore, when the semiconductor layer portion is shorted to the corresponding gate electrode in order to create a short circuit between the drain portion and the corresponding gate line, this eliminates the need for separately providing a short-circuit region.

On the other hand, if the short-circuit region is formed to extend from the gate line or the gate electrode, the formation of the relatively large short-circuit region reliably allows the above-described short circuit even while the drain portion, the gate line, and other elements form fine patterns.

Furthermore, when, in the repair step, the corresponding auxiliary capacitor element is electrically isolated from the corresponding drain portion, this can prevent display defects due to a short circuit between the auxiliary capacitor element and the corresponding source line even with failures of the auxiliary capacitor element.

Moreover, when a region of the semiconductor layer portion coinciding with a portion of the corresponding source line is cut, for example, by laser beams, the laser beams are blocked by the corresponding source line. On the other hand, when the light-blocking layer is formed on the layer on which the corresponding source line is formed to coincide with a region of the semiconductor layer portion which is to be cut, the laser beams for cutting the semiconductor layer portion are blocked by the light-blocking layer. In addition, the light-blocking layer can be formed in the same process step as the formation of the source line.

Advantages of the Invention

According to the present invention, a drain portion of a TFT of a pixel to be repaired is shorted to a corresponding gate line, and, in the pixel, a corresponding source line and the gate line are electrically isolated from each other. Therefore, the pixel can be repaired by being displayed in black, and a reduction in the voltage of the source line is avoided by preventing the electric potential of the source line from being reduced by being pulled to the electric potential of the gate line. This reliably reduces display defects including single-line and cross-line display defects.

DESCRIPTION OF REFERENCE CHARACTERS

1 Liquid Crystal Display
5 Liquid Crystal Layer
10 TFT Substrate
11 CS Line
12 Pixel
12a Repaired Pixel
13 Gate Line
14 Source Line
15 Pixel Electrode
16 TFT
17 Gate Electrode
18 Source Portion
19 Drain Portion
20 Semiconductor Layer Portion
25 Drain Electrode
27 Line Portion
30 Auxiliary Capacitor Element
33 Short-Circuit Region
35 Short-Circuit Portion
36 First Cut Portion (Cut Portion)
37 Second Cut Portion
39 Short-Circuit Line
40 Light-Blocking Layer

DESCRIPTION OF EMBODIMENTS

Figure 1:
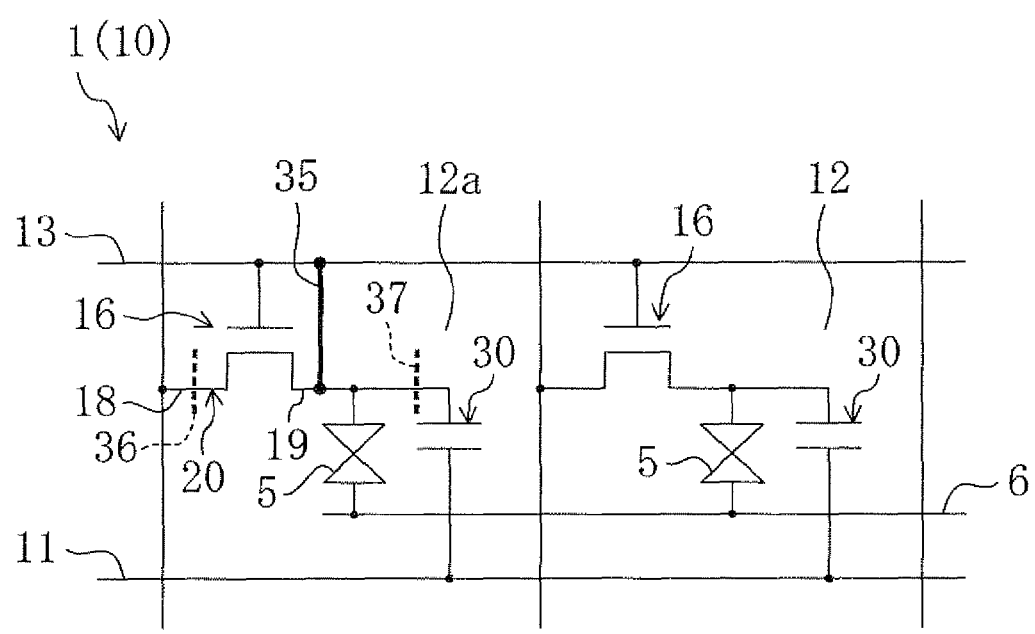
FIG. 1 is a circuit diagram illustrating the configuration of a liquid crystal display according to a first embodiment of the present invention.
Figure 2:
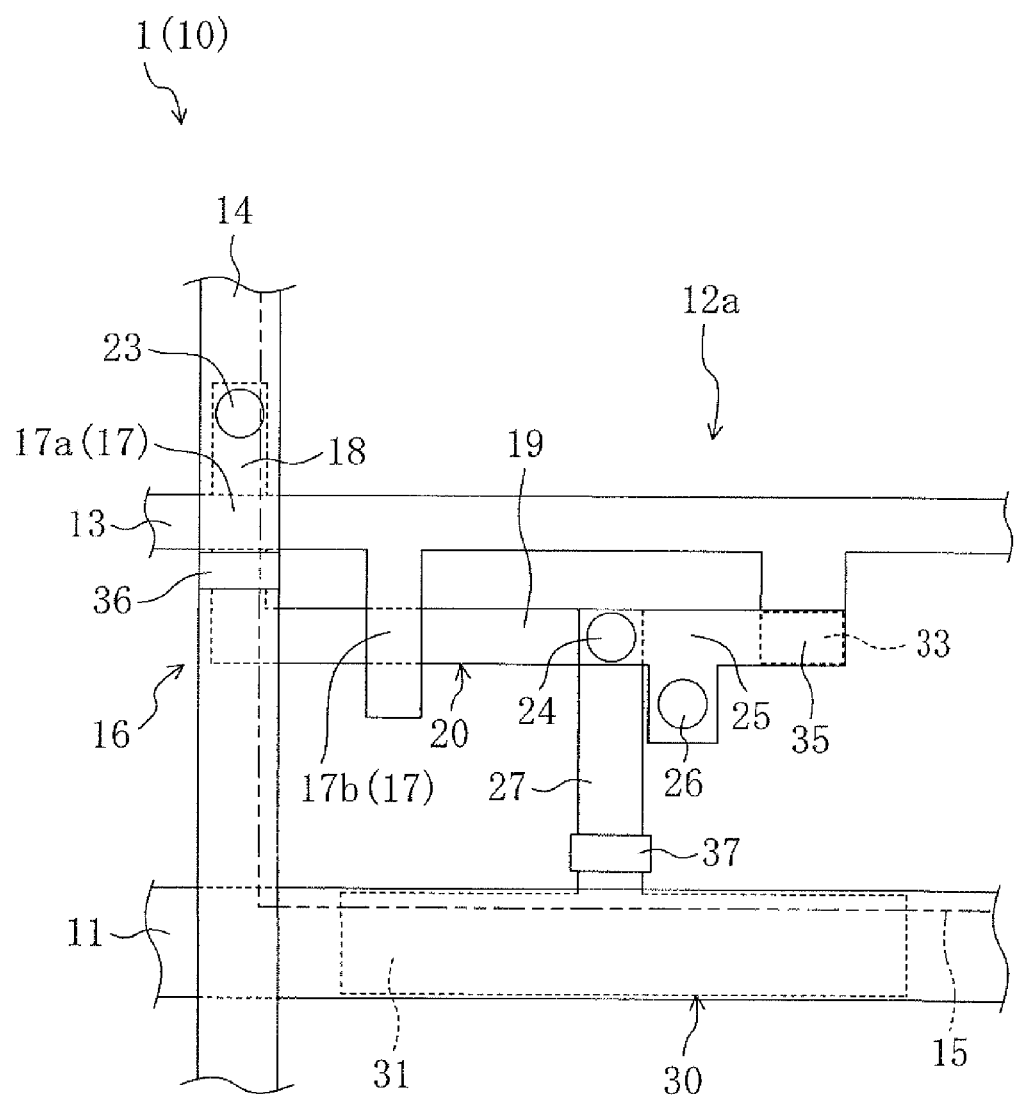
FIG. 2 is an enlarged plan view illustrating a portion of a repaired pixel.

Embodiments of the present invention will be described below in detail with reference to the drawings. The present invention is not limited to the following embodiments.
<<Embodiment 1 of the Invention>>
FIGS. 1 and 2 illustrate a first embodiment of the present invention. A liquid crystal display is used as an example of a display to explain the first embodiment. FIG. 1 is a circuit diagram illustrating the configuration of a liquid crystal display 1 according to the first embodiment. FIG. 2 is an enlarged plan view illustrating a portion of a repaired pixel according to the first embodiment.

The liquid crystal display 1 is an active matrix liquid crystal display, and includes a TFT substrate 10, a counter substrate (not shown) opposed to the TFT substrate 10, and a liquid crystal layer 5 provided between the counter substrate and the TFT substrate 10. Furthermore, the liquid crystal display 1 is a normally white liquid crystal display configured as follows: when no voltage is applied to the liquid crystal layer 5, the display appears white; and when a voltage is applied thereto, the display appears black. As illustrated in FIG. 1, a counter electrode 6 is formed on the counter substrate to apply a voltage to the liquid crystal layer 5.

On the other hand, the TFT substrate 10 is configured as a so-called active matrix substrate. As illustrated in FIG. 1, a matrix of a plurality of pixels 12 each forming a unit area of display is formed on the TFT substrate 10. A plurality of gate lines 13 are formed on the TFT substrate 10 to extend parallel to one another. Furthermore, a plurality of source lines 14 are formed on the TFT substrate 10 to extend parallel to one another, and are arranged orthogonal to the gate lines 13.

Moreover, a plurality of CS lines 11 are formed on the TFT substrate 10 to extend parallel to the gate lines 13. Thus, a group of lines consisting of the gate lines 13, the source lines 14, and the CS lines 11 is patterned in a grid-like manner on the TFT substrate 10.

The pixels 12 are formed, for example, by rectangular regions defined by the source lines 14 and the CS lines 11. Each of the pixels 12 is formed with a rectangular pixel electrode 15 for driving the liquid crystal layer 5.

Each pixel 12 is provided with a TFT (thin-film transistor) 16 forming a switching element for switching the corresponding pixel electrode 15. The TFT 16 includes a semiconductor layer portion 20 including a source portion 18 and a drain portion 19, and a gate electrode 17. FIG. 2 illustrates a double gate TFT including two gate electrodes 17.

One of the gate electrodes, i.e., the gate electrode 17a, is comprised of a region of a corresponding gate line 13 coinciding with a portion of a corresponding source line 14. The other gate electrode 17b branches from the gate line 13 and extends vertically to the gate line 13. In view of the above, the gate electrodes 17 are electrically connected to the gate line 13.

As illustrated in FIG. 2, a semiconductor layer portion 20 is formed by an L-shaped silicon pattern. A portion of the semiconductor layer portion 20 extends along the source line 14 while coinciding with a portion of the source line 14, and a distal end thereof (i.e., the distal end of a source portion 18) is connected through a contact hole 23 to the source line 14. In other words, the source line 14 is electrically connected to the source portion 18. On the other hand, the other end of the semiconductor layer portion 20 (i.e., the distal end of a drain portion 19) is connected through a contact hole 24 to a drain electrode 25.

Specifically, the source portion 18 is comprised of a portion of the semiconductor layer portion 20 extending from the gate electrode 17a toward the contact hole 23. On the other hand, the drain portion 19 is comprised of a portion of the semiconductor layer portion 20 extending from the gate electrode 17b toward the contact hole 24. A portion of the semiconductor layer portion 20 located between the two gate electrodes 17a and 17b is also referred to as an inter-channel region.

The drain electrode 25 is a conductive layer formed on the layer on which the source line 14 is formed, and is connected through a contact hole 26 to a pixel electrode 15. In other words, the drain portion 19 of the TFT 16 is connected to the pixel electrode 15 through the drain electrode 25 and the contact hole 26.

Furthermore, each pixel 12 is provided with an auxiliary capacitor element 30 for maintaining the display potential of the pixel 12. Specifically, the semiconductor layer portion 20 is connected with the auxiliary capacitor element 30 via a corresponding line portion 27. As illustrated in FIG. 2, the auxiliary capacitor element 30 includes a portion of a corresponding CS line 11, and a capacitor electrode 31 which is opposed to the CS line 11 with an insulating layer interposed therebetween and which extends along the CS line 11.

The line portion 27 is made of the same material as the semiconductor layer portion 20, and formed integrally with the semiconductor layer portion 20. The line portion 27 is integrally connected at one end to the drain portion 19 of the semiconductor layer portion 20 while being integrally connected at the other end to the capacitor electrode 31. In other words, the capacitor electrode 31 is also made of the same material as the semiconductor layer portion 20.

In each pixel 12, a short-circuit region 33 which may be used to create a short circuit between the drain portion 19 of the corresponding TFT 16 and the gate line 13 is extended from the corresponding gate line 13. Like the gate electrode 17b, the short-circuit region 33 branches from the gate line 13 and extends vertically to the gate line 13. On the other hand, a portion of the drain electrode 25 extends along the gate line 13, and a distal end portion thereof is opposed to the short-circuit region 33.

Moreover, some of the plurality of pixels 12 form repaired pixels 12a which have been repaired by being displayed in black. As illustrated in FIG. 2, the repaired pixels 12a each include a short-circuit portion 35 for creating a short circuit between the drain portion 19 of the corresponding TFT 16 and the corresponding gate line 13, and a first cut portion 36 formed by cutting the semiconductor layer portion 20 of the corresponding TFT 16 to allow electrical isolation between the corresponding source line 14 and the corresponding gate line 13.

The short-circuit portion 35 creates a short circuit between the drain portion 19 and the gate line 13 in the following manner: the drain electrode 25 forming a conductive layer formed on the layer on which the source line 14 is formed, and connected to the drain portion 19 is shorted to the gate line 13 by the short-circuit region 33. In other words, the short-circuit portion 35 is formed on the short-circuit region 33.

On the other hand, the first cut portion 36 coincides with a portion of the source line 14. For example, as illustrated in FIG. 2, the first cut portion 36 is formed in a portion of the semiconductor layer portion 20 located near the gate electrode 17a and toward the gate electrode 17b.

Furthermore, the repaired pixels 12a each include a second cut portion 37 formed by cutting the corresponding line portion 27 to allow electrical isolation between the corresponding auxiliary capacitor element 30 and the drain portion 19 of the corresponding TFT 16. The second cut portion 37 is formed, for example, in the vicinity of the corresponding capacitor electrode 31.

For each of normal pixels 12 which do not cause display defects, a signal voltage is supplied to the corresponding pixel electrode 15 through the corresponding source line 14, the corresponding source portion 18, and the corresponding drain portion 19, while a scan voltage is applied to the corresponding gate electrodes 17 through the corresponding gate line 13. Thus, the auxiliary capacitor element 30 stores charge to maintain the display potential of the pixel 12. In this way, the pixel 12 is displayed as desired.

For example, a voltage of −5 V is applied to the gate line 13. This state corresponds to a low state. When a predetermined pixel row is scanned, a voltage of 10 V is applied to the gate line 13. This state corresponds to a high state. On the other hand, a voltage of 0-+5 V is applied to a corresponding counter electrode. Thus, while a short circuit is created between the gate line 13 and the drain portion 19 by the short-circuit portion 35, a voltage of approximately 5-10 V which is equal to the difference between the voltage applied to the gate line 13 in the low state (−5 V) and the voltage applied to the counter electrode (0-+5 V) is applied to a corresponding liquid crystal layer 5. In view of the above, a voltage of 5 V or more is applied to the normally white liquid crystal layer 5. Consequently, the repaired pixel 12a is displayed in black.

On the other hand, for each of the repaired pixels 12a, a short circuit is created between the corresponding drain portion 19 and the corresponding gate line 13 by the corresponding short-circuit portion 35. Therefore, a relatively high voltage is applied to the corresponding pixel electrode 15. Thus, the repaired pixel 12a is displayed in black. In this case, since the first cut portion 36 is formed, the electric potential of the corresponding source line 14 is not affected by the short-circuit portion 35 and, therefore, is not reduced. Furthermore, even when the auxiliary capacitor element 30 includes a shorting defect, etc., the formation of the second cut portion 37 prevents the voltage applied to the pixel electrode 15 from being affected by the defect in the auxiliary capacitor element 30.

-Fabrication Method-

Next, a fabrication method for the liquid crystal display 1 will be described.

The liquid crystal display 1 is fabricated in the following manner: a TFT substrate 10 is bonded to a counter substrate, and a liquid crystal layer 5 is sealed between the substrates by a sealer. One aspect of the present invention is repair of display defects on the TFT substrate 10. Therefore, the repair process will be described.

Specifically, the fabrication method for the liquid crystal display 1 according to the first embodiment includes a repair process for repairing the above-described defective pixel resulting in a bright spot by displaying the pixel in black.

First, before the repair process, when the TFT substrate 10 itself is formed, short-circuit regions 33 are extended from gate lines 13 in the process step of forming gate lines 13. Furthermore, in the process step of forming source lines 14, drain electrodes 25 are formed to partially coincide with the short-circuit regions 33.

In the repair process, a drain portion 19 of a TFT 16 of a defective pixel 12 resulting in a bright spot is shorted to the corresponding gate line 13, and in the defective pixel 12 resulting in the bright spot, a semiconductor layer portion 20 of the TFT 16 is cut to allow electrical isolation between the corresponding source line 14 and the gate line 13. In this manner, a short-circuit portion 35 and a first cut portion 36 are formed.

The short-circuit portion 35 is formed on the short-circuit region 33 of the defective pixel 12 resulting in the bright spot. Thus, the corresponding drain electrode 25 is shorted to the gate line 13. On the other hand, the first cut portion 36 is formed by cutting a region of the semiconductor layer potion 20 coinciding with the source line 14.

Moreover, in this repair process, a line portion 27 of the defective pixel 12 resulting in the bright spot is cut to form a second cut portion 37. This allows electrical isolation between a corresponding auxiliary capacitor element 30 and the drain portion 19 of the TFT 16. The semiconductor layer portion 20 and the line portion 27 can be cut by laser beams.

-Advantages of Embodiment 1-

In view of the above, according to the first embodiment, the repaired pixel 12a of the liquid crystal display 1 includes the short-circuit portion 35 for creating a short circuit between the drain portion 19 of the corresponding TFT 16 and the corresponding gate line 13. The electric potential of the drain portion 19 is, therefore, equal to that of the gate line 13, and a voltage is generally always applied to the normally white liquid crystal layer 5, thereby displaying the repaired pixel 12a in black. This prevents the pixel from appearing bright. This prevention makes it difficult for users of the liquid crystal display 1 to visually recognize a defective pixel. This can prevent degradation in display quality.

Furthermore, since the first cut portion 36 is formed in the semiconductor layer portion 20 of the repaired pixel 12a, the corresponding source line 14 and the corresponding gate line 13 can be electrically isolated from each other. This electrical isolation can prevent the electric potential of the source line 14 from being reduced by being pulled to the electric potential of the gate line 13. As such, the repaired pixel 12a is displayed in black so as to be repaired, and a reduction in the voltage of the source line 14 is prevented, thereby reducing display defects (including single-line and cross-line display defects).

Moreover, the second cut portion 37 is formed in the repaired pixel 12a to allow electrical isolation between the corresponding auxiliary capacitor element 30 and the corresponding drain portion 19, and therefore, even with a failure in the auxiliary capacitor element 30 (such as a failure where the corresponding capacitor electrode 31 is shorted to the corresponding CS line 11), a display failure arising from this failure can be prevented.

Thus, as described above, a set of repair process steps include the formation of the short-circuit portion 35, the first cut portion 36, and the second cut portion 37 in the repaired pixel 12a. In this manner, whatever causes a bright spot display failure of the repaired pixel 12a (regardless of what the cause of a bright spot failure is), the repaired pixel 12a is reliably repaired by being displayed as a black spot, and display defects of other adjacent pixels 12 can be prevented.

Furthermore, the short-circuit region 33 is additionally formed so as to be extended from the gate line 13. Therefore, even when the drain portion 19, the gate line 13, and other elements form fine patterns, the formation of the relatively large short-circuit region 33 allows the above-described short circuit with reliability. In other words, the reliability of the repair process can be improved.

In addition, since the first cut portion 36 is placed to coincide with a portion of the source line 14, laser beams for cutting the semiconductor layer portion 20 can be blocked by the source line 14. This eliminates the need for separately and independently providing an underlying layer (light-blocking layer) for blocking the laser beams.

<<Embodiment 2 of the Invention>>

Figure 3:
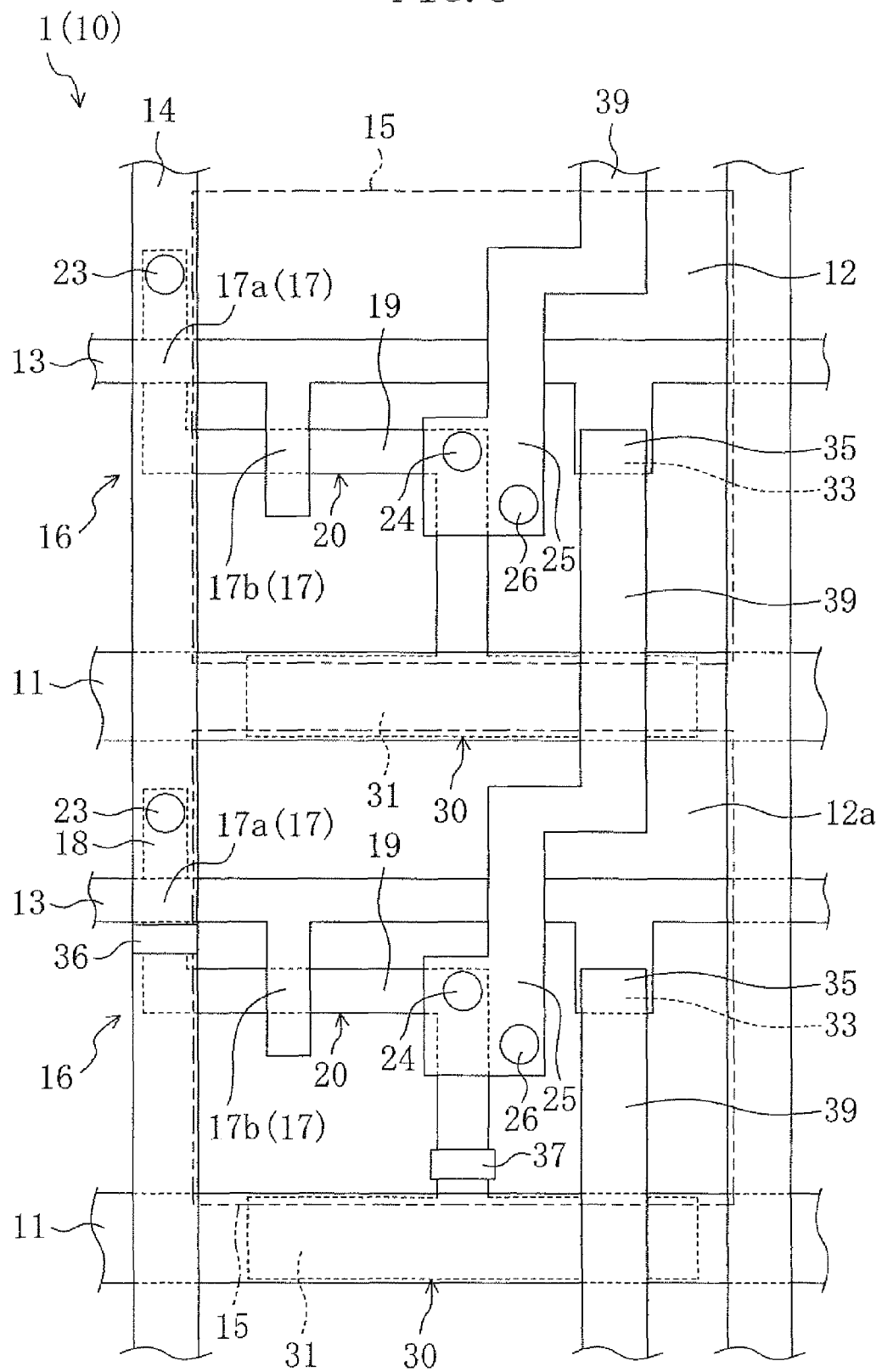
FIG. 3 is an enlarged plan view illustrating two pixels according to a second embodiment of the present invention.
Figure 4:
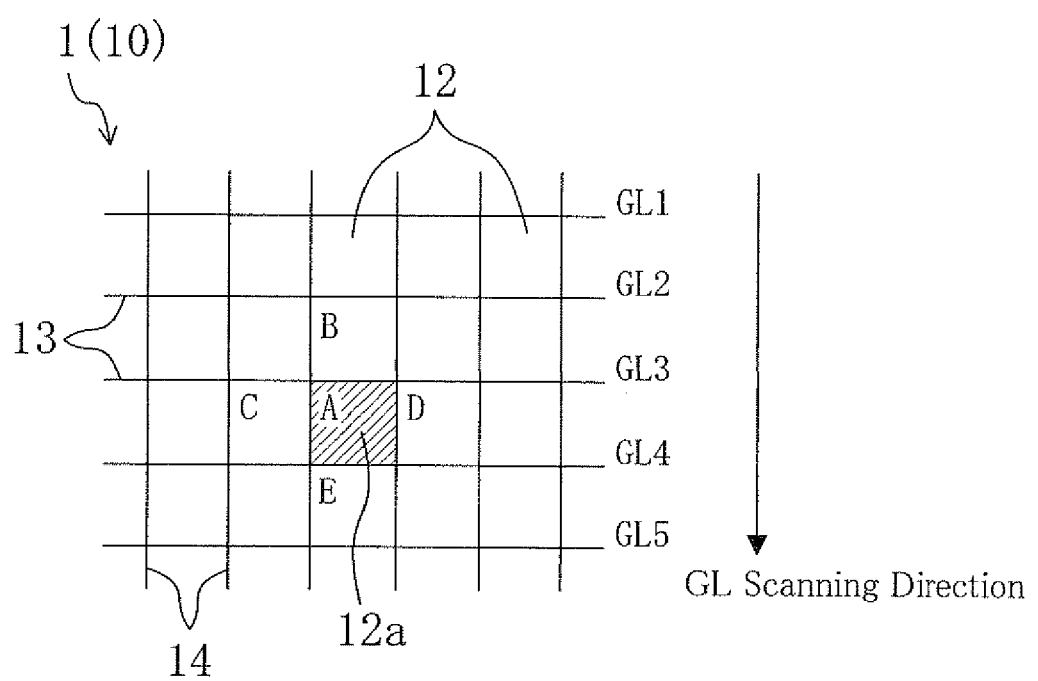
FIG. 4 is a plan view schematically illustrating an arrangement of pixels.

FIGS. 3 and 4 illustrate a second embodiment of the present invention. FIG. 3 is an enlarged plan view illustrating two pixels according to the second embodiment. FIG. 4 is a plan view schematically illustrating an arrangement of pixels. In the following embodiments, like reference characters are used to designate the same components as illustrated in FIGS. 1 and 2, and a detailed explanation thereof is not repeated.

While, in the first embodiment, the short-circuit portion 35 is formed in the repaired pixel 12a, a short-circuit portion 35 is formed in a pixel 12 other than a repaired pixel 12a in the second embodiment.

Specifically, a drain portion 19 of the repaired pixel 12a is shorted to a gate line 13 connected to a TFT 16 of the pixel 12 adjacent to the repaired pixel 12a. The pixel 12 formed with the short-circuit portion 35 is adjacent to the repaired pixel 12a with a CS line 11 interposed therebetween. In view of the above, the gate line 13 to which the drain portion 19 is shorted differs from a gate line 13 connected to a TFT 16 of the repaired pixel 12a.

A short-circuit line 39 for creating a short circuit is extended from a drain electrode 25 of the repaired pixel 12a. As illustrated in FIG. 3, the short-circuit line 39 is integrally connected at one end to the drain electrode 25, while the other end of the short-circuit line 39 coincides with a short-circuit region 33 of the gate line 13 of the adjacent pixel 12. Thus, a short-circuit portion 35 is formed on the short-circuit region 33 of the adjacent pixel 12.

With this configuration, the electric potential of the drain portion 19 of the repaired pixel 12a is equal to that of the gate line 13 connected to the TFT 16 of the adjacent pixel 12. Therefore, a relatively high voltage is applied to a pixel electrode 15 of the repaired pixel 12a. This application allows the repaired pixel 12a to be displayed in black.

For the fabrication of the liquid crystal display 1 of the second embodiment, when a TFT substrate 10 is fabricated, drain electrodes 25 and short-circuit lines 39 are formed in the same process step as the formation of source lines 14. Thereafter, in a repair process, a drain portion 19 of a TFT 16 of a defective pixel 12 resulting in a bright spot is shorted to a gate line 13 connected to a TFT 16 of a pixel 12 other than the defective pixel 12 resulting in the bright spot by such a corresponding short-circuit region 33 as described above. This short circuit can be created by laser beams.

-Advantages of Embodiment 2-

In view of the above, according to this second embodiment, advantages similar to those in the first embodiment can be provided. In addition, degradation in display quality due to the parasitic capacitances between pixels 12 surrounding the repaired pixel 12a and the repaired pixel 12a can be reduced.

This will be described in detail with reference to FIG. 4. The pixel denoted by the character A in FIG. 4 is a repaired pixel 12a displayed in black. A gate electrode of a TFT of the repaired pixel A forms a portion of a gate line GL3. Gate lines GL1-GL5 are scanned downwardly in FIG. 4.

First, if a drain portion of the repaired pixel A is shorted to the gate line GL3 (the structure of the repaired pixel as in the first embodiment), respective pixel electrodes 15 of pixels B, C, D, and E surrounding the repaired pixel A are affected by the parasitic capacitances between the pixels B, C, D, and E and the repaired pixel A at the time when the gate line GL3 is switched off (i.e., in the low state). Thus, the electric potentials of the pixel electrodes 15 are changed. This may degrade display quality.

Immediately next to the repaired pixel A, the pixel E below the repaired pixel A is scanned, and data are written into the pixel E. Therefore, the electric potential of the pixel electrode 15 of the pixel E relatively immediately returns to its normal value. On the other hand, the electric potentials of the respective pixel electrodes 15 of the three pixels B, C, and D are different from their normal values until data are next written into the pixels B, C, and D. This may affect display quality.

However, if the drain portion of the repaired pixel A is shorted to the gate line GL2 as in the second embodiment, the respective pixel electrodes 15 of the pixels B, C, D, and E surrounding the repaired pixel A are affected by the parasitic capacitances between the pixels B, C, D, and E and the repaired pixel A at the time when the gate line GL2 is switched off (i.e., in the low state). Therefore, display quality may be changed. However, data are subsequently written into the gate line GL3, thereby immediately returning the electric potentials of the respective pixel electrodes 15 of the pixels C, D, and E to their normal values. This can improve display quality of pixels surrounding the repaired pixel A as compared to when the drain portion of the repaired pixel A is shorted to the gate line GL3 (the structure of the repaired pixel as in the first embodiment).

In view of the above, when relatively large parasitic capacitances are caused between the repaired pixel 12a and the surrounding pixels 12, the structure of the second embodiment is advantageous in order to improve display quality. If the parasitic capacitances are relatively small, and therefore, can be ignored, the structure of the first embodiment is preferable in order to increase the aperture ratio of the display.

<<Embodiment 3 of the Invention>>

Figure 5:
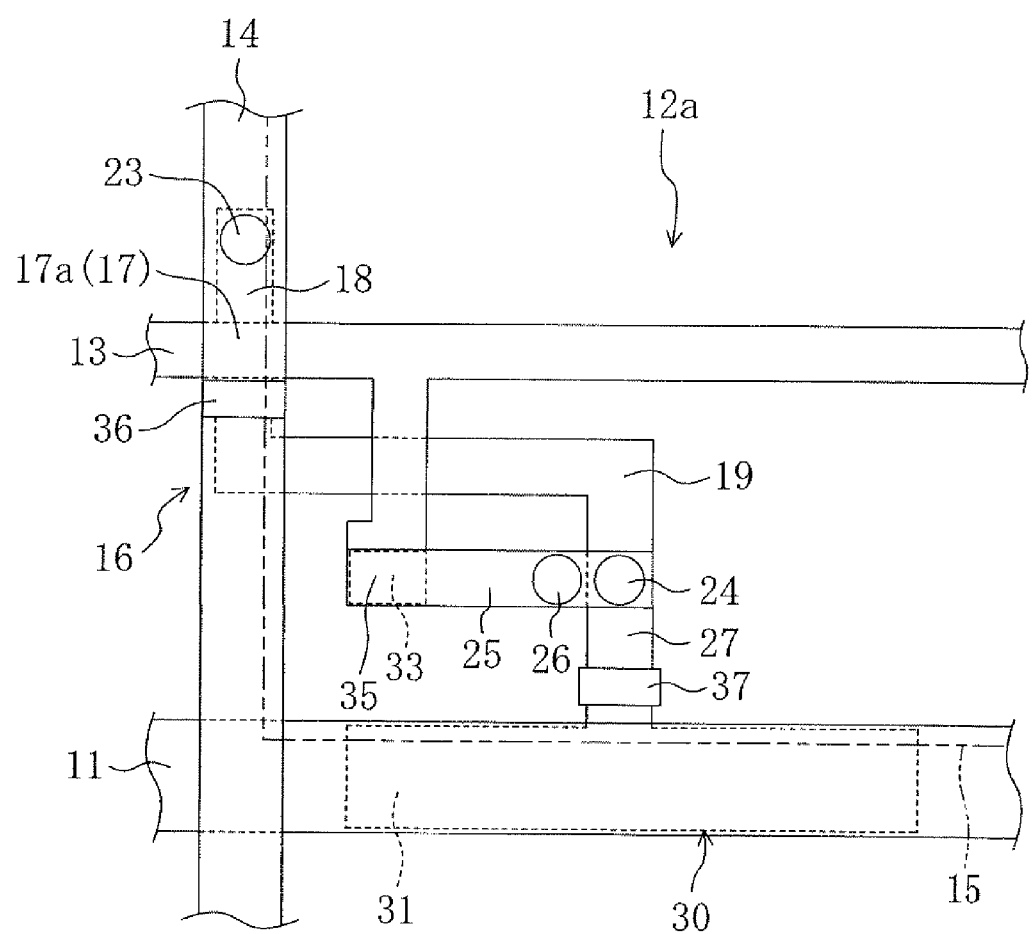
FIG. 5 is an enlarged plan view illustrating a portion of a repaired pixel according to a third embodiment.

FIG. 5 illustrates a third embodiment of the present invention. FIG. 5 is an enlarged plan view illustrating a portion of a repaired pixel according to the third embodiment.

While, in the first embodiment, the gate line 13 is formed with the short-circuit region 33, a gate electrode 17 of a TFT 16 is formed with a short-circuit region 33 in the third embodiment.

Specifically, as illustrated in FIG. 5, in each of pixels 12, a short-circuit region 33 is extended from a distal end of a gate electrode 17 of a corresponding TFT 16. The width of the short-circuit region 33 along the length of a corresponding gate line 13 is greater than that of the gate electrode 17. On the other hand, a corresponding drain electrode 25 is extended so that a portion thereof coincides with the short-circuit region 33. The portion of the drain electrode 25 is, therefore, opposed to the short-circuit region 33. In a repaired pixel 12a of the pixels 12, a short-circuit portion 35 is formed on the corresponding short-circuit region 33. With such a configuration, the electric potential of a drain portion 19 of the repaired pixel 12a is equal to that of the corresponding gate line 13. Therefore, a relatively high voltage is applied to a pixel electrode 15 of the repaired pixel 12a. This allows the repaired pixel 12a to be displayed in black as in the first embodiment.

For the fabrication of the liquid crystal display 1 of the third embodiment, when a TFT substrate 10 is fabricated, drain electrodes 25 are formed in the same process step as the formation of source lines 14 to partially coincide with the short-circuit region 33. Thereafter, in a repair process, a drain portion 19 of a defective pixel 12 resulting in a bright spot is shorted to a corresponding gate line 13 by the corresponding short-circuit region 33. This short circuit can be created by laser beams. In view of the above, the third embodiment can also provide advantages similar to those in the first embodiment.

<<Embodiment 4 of the Invention>>

Figure 6:
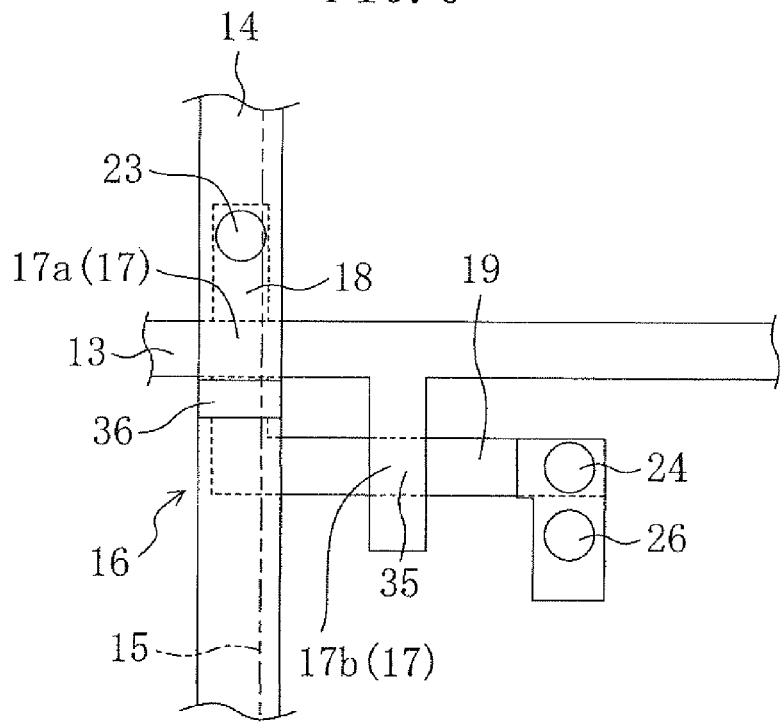
FIG. 6 is an enlarged plan view illustrating a portion of a repaired pixel according to a fourth embodiment.

FIG. 6 illustrates a fourth embodiment of the present invention. FIG. 6 is an enlarged plan view illustrating a portion of a repaired pixel according to the fourth embodiment. In FIG. 6, an auxiliary capacitor element 30 is not illustrated.

While, in the first embodiment, the gate line 13 is provided with the short-circuit region 33, such a short-circuit region 33 is not provided in the fourth embodiment.

Specifically, in the fourth embodiment, a short-circuit portion 35 of a repaired pixel 12a is formed to create a short circuit between a corresponding semiconductor layer portion 20 and a corresponding gate electrode 17b. This allows a short circuit between a drain portion 19 of a corresponding TFT 16 and a corresponding gate line 13.

With such a configuration, the electric potential of the drain portion 19 of the repaired pixel 12a is equal to that of the gate line 13 through the short-circuit portion 35 of the gate electrode 17. Therefore, a relatively high voltage is applied to a pixel electrode 15 of the repaired pixel 12a. This allows the repaired pixel 12a to be displayed in black as in the first embodiment.

For the fabrication of the liquid crystal display 1 of the fourth embodiment, in a repair process, a gate electrode 17 of a defective pixel 12 resulting in a bright spot is shorted to a corresponding semiconductor layer portion 20 by laser beams, etc. This allows a short circuit between a corresponding drain portion 19 and a corresponding gate line 13.

In view of the above, the fourth embodiment can also provide advantages similar to those in the first embodiment. The fourth embodiment is preferable because the aperture ratio of the display can be increased when the width of the gate electrode 17 is relatively great, for example.

<<Other Embodiments>>

Figure 7:
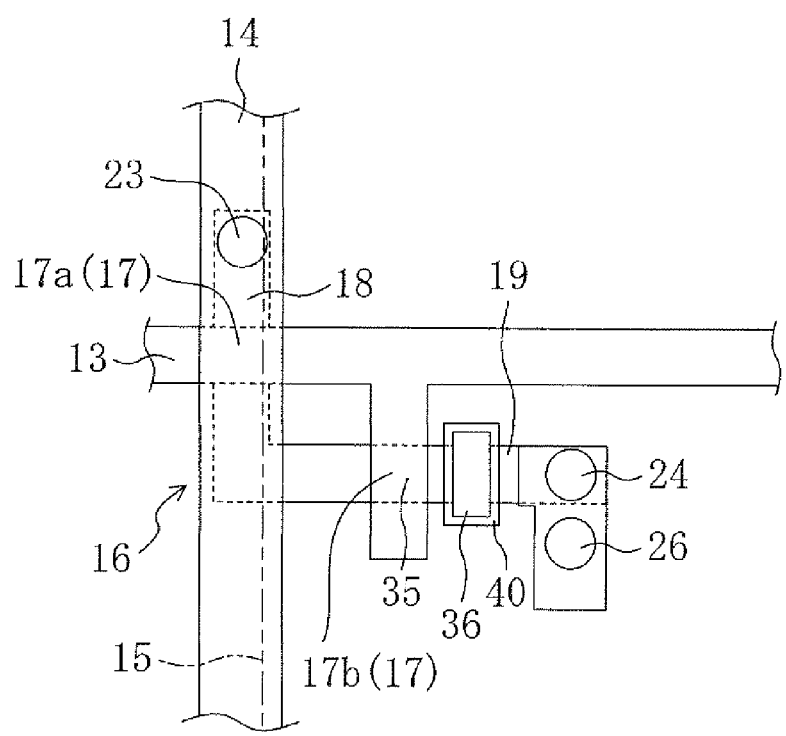
FIG. 7 is an enlarged plan view illustrating a portion of a repaired pixel according to other embodiments.

Although, in the first embodiment, the first cut portion 36 is placed to coincide with a portion of the source line 14, the present invention is not limited to such a configuration. Specifically, the first cut portion 36 may be placed so as not to coincide with a portion of the source line 14. Furthermore, as illustrated in FIG. 7 which is an enlarged plan view of a pixel, a light-blocking layer 40 formed on the layer on which a source line 14 is formed may be provided so that a first cut portion 36 is formed to coincide with the light-blocking layer 40. For the fabrication of the first cut portion 36, before a repair process, the light-blocking layer 40 is formed on the layer on which the source line 14 is formed to coincide with a region of a semiconductor layer portion 20 which is to be cut. Thereafter, in the repair process, the region of the semiconductor layer portion 20 coinciding with the light-blocking layer 40 is cut by laser beams, etc., thereby forming the first cut portion 36.

In view of the above, since the light-blocking layer 40 can block laser beams, etc., this can reduce degradation of the characteristics of a liquid crystal layer 5 due to the application of laser beams, etc., to the liquid crystal layer 5. Furthermore, the light-blocking layer 40 may be electrically connected to a drain portion 19 of a corresponding TFT 16. On the other hand, the light-blocking layer 40 may be electrically floated like an island.

Moreover, although, in each of the above embodiments, the liquid crystal display 1 has been described, the present invention is not limited to this system, but may be practiced with any other active matrix displays.

Industrial Applicability

As described above, the present invention is useful for a display in which a defective pixel is repaired by being displayed in black, and a method for fabricating the same.

The invention claimed is:

1. A method for fabricating an active matrix display including

TFTs which are provided in one-to-one correspondence with a plurality of pixels and each include a semiconductor layer portion including a source portion and a drain portion, and a gate electrode, source lines connected to the source portions of the TFTs, and gate lines connected to the gate electrodes of the TFTs, the method comprising:

a repair step of repairing one of the pixels resulting in a defective bright spot so as to display the pixel in black, wherein in the repair step, the drain portion of the TFT of the pixel resulting in the defective bright spot is shorted to the corresponding gate line, and in the pixel resulting in the defective bright spot, the semiconductor layer portion of the TFT is cut to allow electrical isolation between the corresponding source line and the corresponding gate line.

2. The method of claim 1, wherein
in the repair step, the drain portion of the TFT of the pixel resulting in the defective bright spot is shorted to the gate line connected to the TFT of one of the pixels other than the pixel resulting in the defective bright spot.

3. The method of claim 1, wherein
in the repair step, the drain portion of the TFT is shorted to the corresponding gate line by creating a short circuit between the corresponding semiconductor layer portion and the gate electrode of the TFT.

4. The method of claim 1, wherein
in each of the pixels, a short-circuit region for creating a short circuit between the drain portion of the corresponding TFT and the corresponding gate line is extended from the gate line or the gate electrode of the TFT, and
in the repair step, the drain portion of the TFT is shorted to the gate line by the short-circuit region.

5. The method of claim 1, wherein
in the repair step, a conductive layer formed on a layer on which the corresponding source line is formed, and thus, connected to the corresponding drain portion is shorted to the corresponding gate line.

6. The method of claim 1, wherein
auxiliary capacitor elements for maintaining display potentials of the corresponding pixels are provided in one-to-one correspondence with the plurality of pixels, and
in the repair step, the auxiliary capacitor element of the pixel resulting in the defective bright spot is further electrically isolated from the drain portion of the corresponding TFT.

7. The method of claim 1, wherein
in the repair step, a region of the semiconductor layer portion coinciding with a portion of the corresponding source line is cut.

8. The method of claim 1, wherein
in the repair step, a region of the semiconductor layer portion which does not coincide with a portion of the corresponding source line is cut.

9. The method of claim 1, wherein
before the repair step, a light-blocking layer is formed on a layer on which the corresponding source line is formed to coincide with a region of the semiconductor layer portion which is to be cut.

10. The method of claim 9, wherein
the light-blocking layer is electrically connected to the drain portion of the corresponding TFT.

11. The method of claim 9, wherein
the light-blocking layer is electrically floated like an island.

12. An active matrix display comprising:
TFTs provided in one-to-one correspondence with a plurality of pixels;
source lines connected to the TFTs; and
gate lines connected to the TFTs,
wherein at least one of the plurality of pixels is a repaired pixel which is repaired so as to be displayed in black, and
the repaired pixel includes
a short-circuit portion for creating a short circuit between a drain portion of the corresponding TFT and the corresponding gate line; and
a cut portion formed by cutting a semiconductor layer portion of the corresponding TFT to allow electrical isolation between the corresponding source line and the corresponding gate line.

13. The display of claim 12, wherein
the drain portion of the TFT of the repaired pixel is shorted to the gate line connected to the TFT of one of the pixels other than the repaired pixel.

14. The display of claim 12, wherein
the short-circuit portion creates a short circuit between the corresponding semiconductor layer portion and the gate electrode of the corresponding TFT, thereby creating a short circuit between the drain portion of the corresponding TFT and the corresponding gate line.

15. The display of claim 12, wherein
in each of the pixels, a short-circuit region for creating a short circuit between the drain portion of the corresponding TFT and the corresponding gate line is extended from the gate line or the gate electrode of the corresponding TFT, and
the short-circuit portion is formed on the short-circuit region.

16. The display of claim 12, wherein
the short-circuit portion creates a short circuit between a conductive layer formed on a layer on which the corresponding source line is formed so as to be connected to the corresponding drain portion, and the corresponding gate line.

17. The display of claim 12, wherein
auxiliary capacitor elements for maintaining display potentials of the corresponding pixels are provided in one-to-one correspondence with the plurality of pixels, and
the auxiliary capacitor element of the repaired pixel is further electrically isolated from the drain portion of the corresponding TFT.

18. The display of claim 12, wherein
the cut portion is formed to coincide with a portion of the corresponding source line.

19. The display of claim 12, wherein
the cut portion is formed so as not to coincide with a portion of the source line.

20. The display of claim 12, wherein
a light-blocking layer is formed on a layer on which the source line is formed to coincide with the cut portion.

21. The display of claim 20, wherein
the light-blocking layer is electrically connected to the drain portion of the corresponding TFT.

22. The display of claim 20, wherein
the light-blocking layer is electrically floated like an island.

* * * * *